2,996,558
MOLECULAR SIEVE SEPARATION PROCESS
George F. Feldbauer, Jr., Cranford, N.J., assignor to Esso Research and Engineering Company, a corporation of Delaware
Filed Apr. 17, 1957, Ser. No. 653,450
5 Claims. (Cl. 260—708)

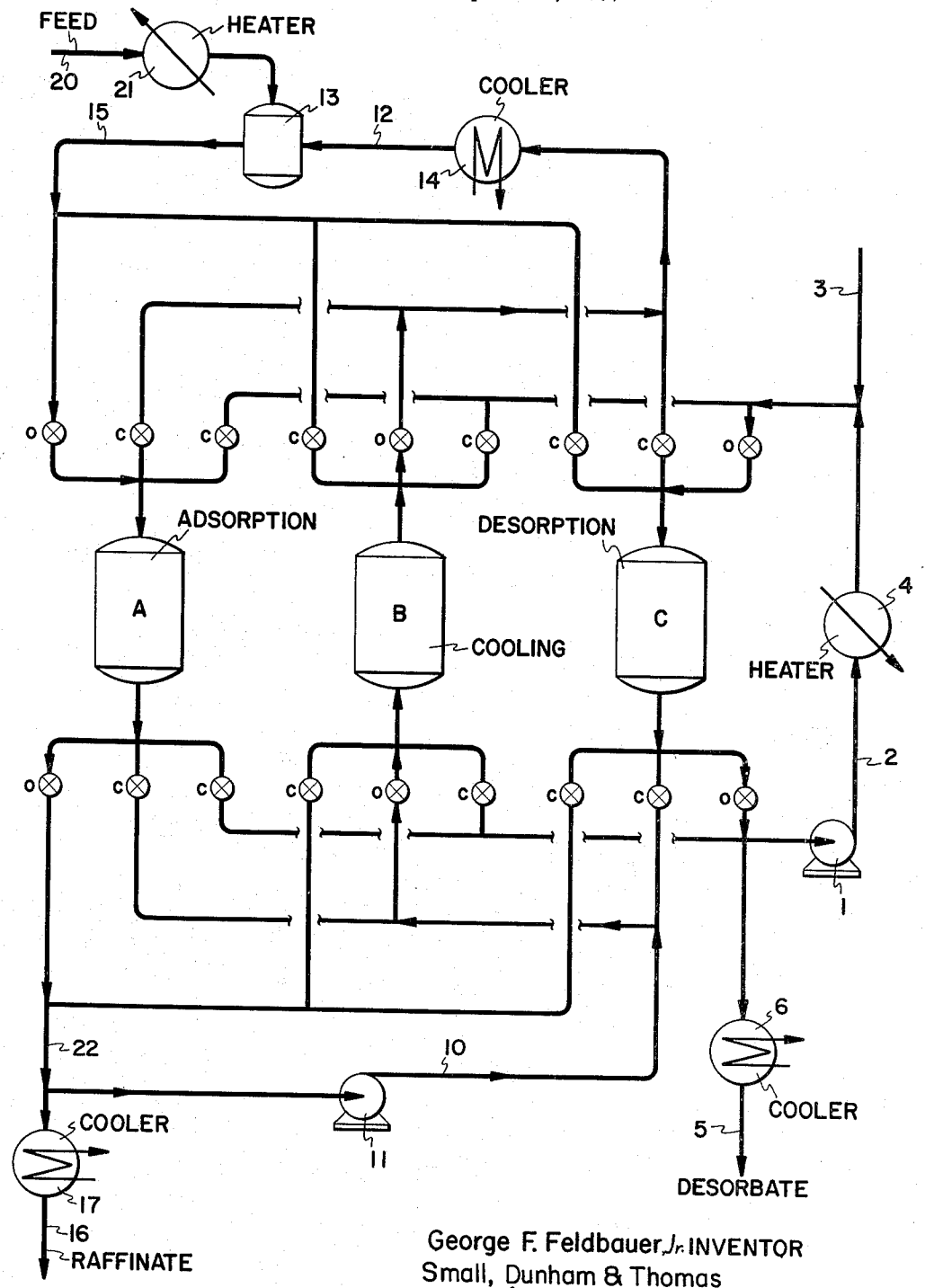

The present invention is concerned with an improved process for the separation and segregation of straight chain hydrocarbons from mixtures comprising branched chain hydrocarbons and/or cyclic or aromatic hydrocarbons. The invention is more particularly concerned with a method of improving the overall thermal efficiency of a molecular sieve separation process including both the adsorption stage and the desorption stage. In accordance with the present process, the paraffin hydrocarbons are efficiently adsorbed on the sieve and likewise desorbed from the sieve with excellent thermal efficiency.

It has been known for some time that certain zeolites, both naturally-occurring and synthetic, have the property of separating normal from isomeric branch chained hydrocarbons, as well as from cyclic and aromatic admixtures. These zeolites have crystalline structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3–5 Angstrom units to 12–15 or more, but it is a property of these zeolites, or molecular sieves, that for a particular sieve the pores are of substantially uniform size.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g. sodium and/or calcium, magnesium, etc. Analcite has the empirical formula $NaAlSi_2O_6 \cdot H_2O$. Barrer (U.S. 2,306,610) teaches that all or part of the sodium is replaceable by calcium to yield, on dehydration, a molecular sieve having the formula $(CaNa_2)Al_2Si_4O_{12} \cdot 2H_2O$. Black (U.S. 2,522,426) describes a synthetic molecular sieve having the formula $4CaO \cdot Al_2O_3 \cdot 4SiO_2$. A large number of other naturally-occurring zeolites having molecular sieve activity, i.e., the ability to adsorb a straight-chain hydrocarbon and exclude the branch chain isomers, are described in an article "Molecular Sieve Action of Solids" appearing in Quarterly Reviews, vol. III, pp. 293–330 (1949) and published by the Chemical Society (London).

Desorption of material from molecular sieves may be brought about; (a) by reducing the partial pressure of the adsorbed material in the vapor surrounding the sieve by lowering the total pressure of the system or by purging with a suitable inert gas and (b) by heating the sieve.

In most cases the amount of material which can be removed by reducing partial pressure is very small. For this reason, desorption is generally carried out at a temperature considerably higher than that used in the adsorption step. After desorption, heat must be removed from the sieve to bring it back to adsorption temperature. This heat should be recovered and reused to minimize the overall heat requirements of the process.

In accordance with the present invention, the heat required for desorbing is recovered and effectively utilized.

The present invention utilizes three reaction vessels operated in a coordinated manner. In essence, the reaction vessels designated as A, B and C are operated with respect to each other and with respect to the particular stage as follows:

| Stage | Vessel | | |
|---|---|---|---|
| | A | C | B |
| 1 | Adsorption | Desorption | Cooling. |
| 2 | Desorption | Cooling | Adsorption. |
| 3 | Cooling | Adsorption | Desorption. |
| 1 | Adsorption | Desorption | Cooling. |

The invention will be specifically described in conjunction with the drawing illustrating one adaptation of the same. The reaction vessels are designated as A, B and C. Reaction vessel A is on the adsorption stage, vessel B in the cooling stage and vessel C in the desorption stage. The streams are properly directed by means of the manifold of valves shown. The open valves are indicated by the letter "o" and the closed valves by the letter "c." Of course, as the vessels shift from one stage of the operation to the other, the appropriate valves are opened and closed in a manner which is obvious to those skilled in the art. Also for purposes of description, it is assumed that the adsorption stage is conducted at a temperature of about 250° F. and that the desorption stage is conducted at a temperature of about 600° F.

Referring specifically to the drawing, vessel C is being desorbed by heating with a recycle stream of desorbate (i. e., the material previously adsorbed on the adsorbent) which is recycled by means of pump 1 and line 2. To initiate desorption, desorbate is introduced into the system by means of line 3 to serve as the heat transfer medium. This cycling desorbate transfers heat from heater to vessel C. As the heat of the adsorbent increases, the material adsorbed is forced out and joins in the cycle. Vessel C is heated to a temperature of about 600° F. Thus, the temperature at the inlet of vessel C will start to rise to a higher temperature. As the desorption cycle proceeds, the inlet of vessel C will be about 600° F. and the outlet at a temperature between 250° F. and 600° F. A heat front of about 600° F. under the conditions specified will move downwardly from the top of vessel C to the bottom or outlet of vessel C. When the temperature at the outlet of vessel C is about 600° F., the desorption cycle is completed and the desorbate is removed through line 5. At this point vessel C is swung to the cooling cycle illustrated by vessel B and described in conjunction with the adsorption cycle illustrated by vessel A.

Vessel B contains sieve material, the temperature of which is about 600° F. Feed material is introduced into the system by line 20 and is heated in heater 21 to a temperature of about 250° F. At the start of the cycle, the sieve material in vessel A is about 250° F. Under certain conditions, this sieve material may be at a somewhat lower temperature in order to compensate for the heat of adsorption which will tend to raise the temperature somewhat. The feed material is introduced into the top of vessel A by means of line 15 and withdrawn from the bottom by means of line 22. A portion may be cooled in heat exchange 17 which may comprise heater 21 and withdrawn as a raffinate from the system by means of line 16. A portion of the raffinate is recycled to the bottom of vessel B by means of line 10 and pump 11. This raffinate at a temperature of 250° F. contacts the sieve material at a temperature of 600° F. in vessel B and is withdrawn from vessel B at a temperature approaching 600° F. This material is introduced into vessel 13 wherein it contacts the feed material and tends to vaporize a portion of the feed material. A cooling front will move upwardly through vessel B and at an intermediate point in the cycle, the temperature at the bottom of vessel B will be about 250° F., and the temperature at the top of vessel B between 250° F. and 600° F. A heat balance is maintained by means of cooler 14 and heater 21 so as to have the respective vessels at the desired temperature when one or the other vessel is swung from the desorption to the cooling to the adsorption cycles. The temperatures and pressures maintained in desorption vessel C may comprise any suitable desorption temperatures. The temperatures normally vary from about 500° to 800° F., while the pressure varies from about atmosphere to 100 p.s.i.g. In operation if, for example, it is decided to desorb at 600° F., the desorption cycle will be continued until the temperature at the exit or lower end of C approximates about 600° F.

Simultaneously, and in conformity with the cycle on vessel C, vessel B, previously on the desorption stage, is cooled by a relatively cold stream of effluent from vessel A on the adsorption cycle. This stream is introduced into vessel B by means of line 10 and pump 11.

What is claimed is:

1. In a staged molecular sieve adsorption-desorption process wherein the desorption cycle is conducted at a higher temperature than the adsorption cycle, the improvement which comprises utilizing three stages, maintaining a first stage on desorption, a second stage on cooling and a third stage on adsorption, heating said first stage to bring said solids to a desorption temperature, cooling said second stage from a desorption temperature to an adsorption temperature by passing through said second stage a raffinate stream from said third stage, and heating the feed to said third stage by contacting said raffinate stream after passage through said second stage with said feed stream.

2. Process as defined by claim 1 wherein said second stage after being cooled to adsorption temperature is placed on an adsorption cycle, said third stage is placed on a desorption cycle and said first stage is placed on a cooling cycle.

3. Process as defined by claim 2 wherein said adsorption cycle is conducted at a temperature in the range of from about 100° to 300° F., and said desorption cycle is carried out at a temperature in the range of from about 500° to 800° F.

4. Process as defined by claim 1 wherein the temperature of said desorption cycle is about 600° F. and the temperature of said adsorption is about 250° F.

5. Process defined by claim 1 wherein the said first stage is heated to said desorption temperature by recycling a portion of the desorbate stream.

References Cited in the file of this patent

UNITED STATES PATENTS

| 2,535,902 | Dailey | Dec. 26, 1950 |
| 2,747,681 | Schuftan | May 29, 1956 |
| 2,784,798 | Miller | Mar. 12, 1957 |
| 2,797,190 | Scott | June 25, 1957 |
| 2,815,089 | Turner | Dec. 3, 1957 |
| 2,859,256 | Hess et al. | Nov. 4, 1958 |

OTHER REFERENCES

Riegel: "Heat Exchangers," Chemical Process Machinery, 2d edition, Reinhold Publishing Co., 1953, page 544.